United States Patent

[11] 3,620,371

[72] Inventor Joe M. Valdespino
      Orlando, Fla.
[21] Appl. No. 881,045
[22] Filed Dec. 1, 1969
[45] Patented Nov. 16, 1971
[73] Assignee Aquanox, Inc.
      Ft. Lee, N.J.

[54] AEROBIC WASTE TREATMENT SYSTEM WITH AUTOMATIC BACK FLUSHING FILTER
9 Claims, 3 Drawing Figs.

[52] U.S. Cl. .................................................. 210/117,
      210/140, 210/174, 210/195, 210/258, 210/411
[51] Int. Cl. .................................................. B01d 29/38
[50] Field of Search .......................................... 210/117,
      140, 151, 152, 174, 195, 202, 205, 258, 260, 411

[56]           References Cited
            UNITED STATES PATENTS
3,311,239   3/1967   Valdespino .................. 210/195
3,497,064   2/1970   Valdespino .................. 210/152 X Primary Examiner—Frank A. Spear, Jr.
Attorney—Sughrue, Rothwell, Mion, Zinn & Macpeak ABSTRACT: An aerobic waste material treatment system includes a hydraulic comminutor-reaction tank and a vacuum aeration tank connected by a siphon so that comminuted solids in liquid are siphoned into the vacuum tank. A recirculating pump and fluid connection are positioned between the vacuum tank and hydraulic comminutor to recirculate the mixed liquor from the vacuum tank and reaerate it by an aspirator in the recirculating line while, at the same time, discharging tangentially into the comminutor to aid in centrifugal movement for comminuting purposes. A venturi in the recirculating pump discharge line aspirates from the vacuum tank to draw the vacuum within the vacuum tank. The air for anchor in the vacuum tank is admitted from atmosphere under control of a regulating valve. An automatic back flushing filter is connected to the effluent outlet of the vacuum tank. The filter is periodically back flushed by pulsing air from the outlet side of the filter to flush accumulated material on the filter screen back into the vacuum tank. The vacuum tank may be blown down through a blow down valve in the discharge side of the recirculating pump. Automatic batch chlorination and effluent ejection units are connected to the outlet side of the automatic back flushing filter.

INVENTOR
JOE M. VALDESPINO
BY Sughrue, Rothwell, Mion, Zinn & Macpeak
ATTORNEYS

AEROBIC WASTE TREATMENT SYSTEM WITH AUTOMATIC BACK FLUSHING FILTER

BACKGROUND OF THE INVENTION

1. Field of the Invention

This invention relates to improvements in aerobic waste treatment systems and particularly aerobic waste treatment systems of the type including a hydraulic comminutor-reaeration tank and a vacuum aeration tank connected in series with particular improvements in connection with handling of the solids in the mixed liquor.

2. Description of the Prior Art

It is known in the prior art of aerobic waste material treatment systems to utilize a hydraulic comminutor-reaeration tank in series with a vacuum aeration tank so that influent waste material is comminuted in the hydraulic comminutor transferred to the vacuum aeration tank and aerated, then recirculated to the hydraulic comminutor for reaeration utilizing a venturi aspirator. In the prior art, the subsequent treatment of the aerated mixed liquor is to allow the solids to settle and to then discharge the effluent, either continuously or in batches with or without chlorination. For the settling operation, it is desirable that the settling tank be as stationary as possible, of sufficient size and sufficient time has to be allowed to accomplish efficient settling from quiescent liquid. On shipboard systems, the settling tank rocks with the ship interfering with settling. Also, in shipboard installations, as well as others, where space economy is important small settling tanks require a longer settling time. In other words, for efficient settling, quiescence is required which in turn necessitates a settling tank of relatively large size and consequently heavy weight. On shipboard, this necessitates a large installation expense and takes up needed space. A further problem with a settling tank is its lack of efficiency. For example, a settling tank does not remove ash or other materials with the same specific gravity as water.

On the other hand, the substitution of a filter for the settling tank to perform the same functions, raises numerous additional and perplexing problems. First of all, the filter would quickly clog up requiring rapid changes of the filter or flushings of it. Attempts to flush the filter requires a source of fluid under sufficient pressure and additional components, resulting in consequent complexity and additional cost for the system.

SUMMARY OF THE INVENTION

This invention provides an automatic back flushing filter in an aerobic waste treatment system which allows for a much higher efficiency of the system as it positively removes components which would not settle and is arranged to automatically backflush into a vacuum aeration tank without utilizing a source of fluid under pressure. In addition, a unique batch chlorination and pneumatic ejection system is connected to the system following the filter outlet. Further, the system allows vacuum aeration by a single atmospheric air inlet regulating valve.

The waste treatment system for accomplishing these results includes a hydraulic comminuting-reaeration tank connected to a vacuum aeration tank by a siphon and having a pump for positive recirculation to a venturi aspirator for aspirating and creating vacuum in the vacuum aeration tank and applying the aspirated air to the mixed liquor for reaeration in the hydraulic comminuting-reaeration tank. Air is admitted to the vacuum aeration tank from atmosphere under the control of a regulating valve. Effluent from the vacuum aeration tank is taken off into an automatic back flushing filter having a vacuum connection to one side and a normally closed air connection to the other side of a filter screen. Periodically the normally closed air connection is opened and the vacuum in the vacuum tank sucks a pulse of air against the flow of liquid flushing the accumulated solids on the filter screen back into the vacuum aeration tank. Periodically, the vacuum aeration tank may be blown down from a flow down valve in the outlet of the recirculating pump. Following the filter outlet, there is a pneumatic ejection system with a barometric leg and an automatic chlorination system for batch chlorination of ejected batches of effluent in an ejection tank. The ejection tank is closed but a vent and a source of compressed air with solenoid control valves are connected to it and liquid level sensors in the tank control application of compressed air when the tank is filled to discharge the tank and when the tank is empty allow the effluent from the filter to fill the tank. There is a check valve from the outlet of the filter to the tank. An automatic chlorination system includes a chlorine solution receiver and a measured receiver at a low level which is connected to the receiver through a check valve and to a source of compressed air so that when compressed air is causing ejection, the chlorine in the measured receiver is forced by the compressed air to an elevated receiver where it is held during the ejection cycle by a check valve but is allowed to flow into the ejection tank during the filling of the tank for chlorinating of the effluent.

DETAILED DESCRIPTION OF THE PREFERRED EMBODIMENT

Figure 1:
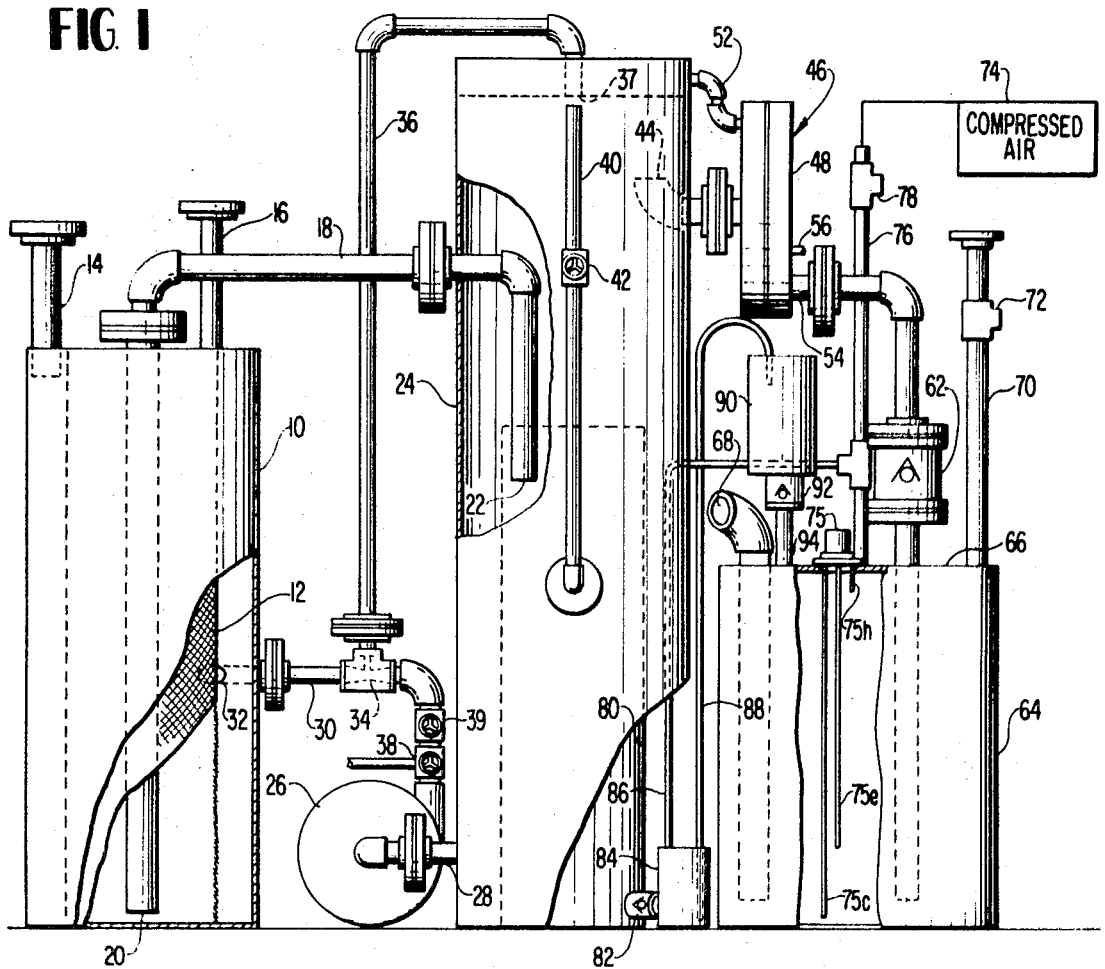
FIG. 1 is a side elevational, partially schematic, view of the waste treatment system of this invention with portions broken away for clarity.

Referring to FIG. 1, a hydraulic comminution-reaeration tank 10 has a grinding screen 12 positioned therein. The grinding screen may be of expanded metal, such as stainless steel, of cylindrical shape, and spaced from the inner cylindrical wall of the tank 10. An influent connection 14 is provided to the tank 10 in the space outside of the expanded metal screen 12. A vent 16 is also connected to the top of the tank 10.

A siphon connection 18 extends into the hydraulic comminution-reaeration tank 10 and has its inlet 20 near the bottom of the tank. The siphon connection 18 has its discharge end 22 within a vacuum aeration tank 24. The aerated comminuted solids and liquids from the vacuum aeration tank 24 are reaerated and recirculated by a pump 26 having its inlet connection 28 near the bottom of the vacuum aeration tank 24. The pump discharges through line 30 at its outlet 32 tangentially into the hydraulic comminution-reaeration tank to assist in centrifugal movement of the liquids and solids and consequent comminution on the grinding screen 12. In the discharge line 30 from the pump 26, there is a venturi aspirator 34 for aspirating air for reaeration purposes. An end 37 of the aspiration line 36 extends into the top of the vacuum aeration tank 24. A blow down valve 38 is connected in line from the discharge of the pump 26 prior to the aspirator and a shut off valve 39 follows the blow down valve for closing off the line to the aspirator during blow down.

For supplying air to the vacuum aeration tank, there is provided an atmospheric air inlet line 40 controlled by an air inlet regulating valve 42. This valve is set to admit the desired quantity of air into the vacuum aeration tank for aeration purposes and this air is further drawn out through aspirator line 36 and introduced into the recirculated mixed liquor for reaeration.

The effluent in the vacuum aeration tank 24 is discharged through discharge connection 44 into a filter 46 where the solids are filtered from the effluent.

Figure 2:
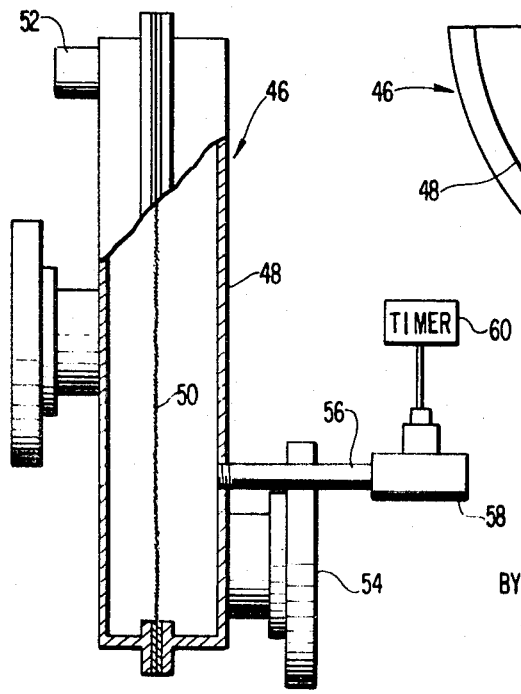
FIG. 2 is a side elevational view of the back flush filter with portions broken away for the sake of clarity.
Figure 3:
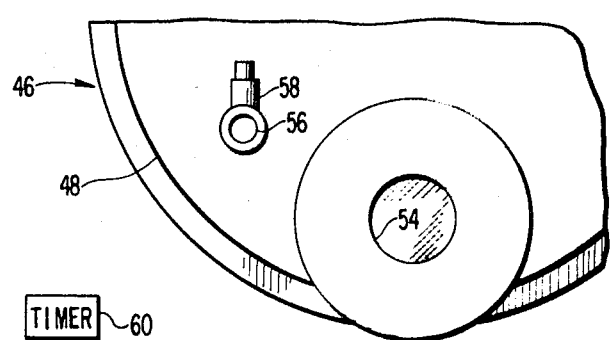
FIG. 3 is a partial end elevation of the back flush filter.

The filter 46 is shown in more detail in FIGS. 2 and 3 and includes a filter housing 48 with a fine mesh screen 50 extending across the housing. This screen, for example, may be a 200 mesh stainless steel screen, although other size screens or even other types of filters capable of back flushing could be used. A vacuum inlet line 52 connects the inlet side of the filter to the top of the vacuum aeration tank 24 to apply vacuum to the inlet side of the filter at all times. The filtered effluent is discharged from the filter through discharge line 54. For back flushing the filter, there is an air inlet line 56 which is normally closed by a solenoid valve 58. The line 56 enters the filter housing 48 on the outlet side thereof at a point above and sufficiently remote from effluent discharge line 54, FIG. 3, so that air entering line 56 will pass in a direction against fluid flow and will not flow out the discharge line 54.

A timer 60 of conventional type is connected to the normally closed solenoid valve 58 for pulsing the valve and allowing atmospheric air to enter at periodic intervals. Due to the vacuum applied to the inlet side of the filter screen, the atmospheric air will pulse the screen, shake it, and cause the filtered solids on the screen to flow back into the vacuum aeration tank. The timer may be set, for example, to allow the solenoid air valve to open for 2 to 4 seconds out of every minute.

The filtered effluent from discharge line 54 passes through a check valve 62 positioned in the line to allow flow in a downward direction only into an effluent receiver tank 64. The top 66 of the tank 64 is at a lower level than the outlet end 22 of the siphon 18 in order to establish a barometric leg. An elevated effluent discharge line 68 extends into tank 64 and allows discharging the effluent in batches. Also connected to the top of tank 64 is a vent 70 with a normally open solenoid valve 72. A source of compressed air 74 is connected to the tank 64 via line 76 through normally closed valve 78. A sensing electrode assembly 75 includes a high electrode 75h, a low electrode 75l, and a common electrode 75c. These electrodes are connected in a conventional manner to an electrical circuit controlling the normally open solenoid valve 72 and normally closed solenoid valve 78 so that, when the tank 64 is up to the level of the high electrode 75h, the normally closed compressed air solenoid valve 78 opens and normally open vent solenoid valve 72 closes allowing compressed air 74 to discharge the effluent in tank 64 through outlet 68. This continues until the level of the effluent is below the level of the low electrode 75l at which time the solenoid valves 72 and 78 revert to their normal positions and then the effluent flow from the filter 46 continues to fill the tank 64 until it fills to the level of high electrode 75h and the discharge cycle starts again. The check valve 62 prevents back flow during the discharge cycle.

A unique chlorination system is provided for batch chlorination during filling of the effluent tank 64. This chlorination unit includes a chlorine solution tank 80, which is connected through a line having a check valve 82, to a measured capacity receiver 84 located at ground level. The receiver 84 will ordinarily fill to its capacity by gravity with the chlorine solution from tank 80 through check valve 82. The capacity of receiver 84 is selected to provide the required chlorination for the amount of effluent discharged from tank 64 during each cycle. An air pressure inlet line 86 connects the top of receiver 84 and the air pressure line 76. A chlorine solution discharge line 88 extends from the bottom of receiver 84 to an elevated receiver 90. A check valve 92 is at the bottom of receiver 90 connected via line 94 into the tank 64.

During the discharge cycle when the compressed air valve 78 is open, compressed air will pass through line 86 into the top of the measured volume receiver 84 closing check valve 82 and forcing the chlorine solution in the receiver 84 at the lower level to the elevated receiver 90 through line 88. At the same time, tank 64 is discharging under pressure, so check valve 92 is closed. However, at the end of the discharge cycle when pressure is removed from tank 64 and vent valve 72 is opened, chlorine solution flows from elevated receiver 90 by gravity past the check valve 92 into the tank at the same time the effluent from the filter 46 is flowing into the tank to accomplish the required chlorination.

It is believed that the operation will be apparent from the foregoing description of the components, but a brief resume will be given. Influent comes into the system through inlet 14 into tank 10 and is comminuted on a grinding screen 12. Mixed liquor recirculated through tangential inlet 32 provides some circumferential flow for comminuting purposes. The comminuted solids and liquid are siphoned through siphon 18 into the vacuum aeration tank 24 and are recirculated via pump 26 for reaeration by the aspirator venturi 34. The mixed liquor in vacuum aeration tank 24 is aerated by air drawn in through atmospheric air inlet 40 under controlled regulating valve 42, due to the vacuum in the tank.

Outflow of the effluent from vacuum aeration tank 24 is through outlet 44 into filter 46 where the fine mesh screen 50 retains the solids which will not pass through the screen and the liquid filtered effluent is discharged through line 54. Periodically, for example every minute, the filter screen is back flushed by timer 60 pulsing air solenoid 58 allowing atmospheric air to be drawn in through line 56 due to the vacuum drawn through line 52 which creates a pressure differential causing back flow through the filter and washing the filter cake back into the vacuum aeration tank. At much longer periodic intervals, such as once every three weeks or months, when the mixed liquor suspended solids concentration exceeds a predetermined level, for example, 7,500 p.p.m., the vacuum tank 24 can be purged by closing valve 39 and opening blow down valve 38.

The filtered effluent passes through filter outlet 54 through check valve 62 into tank 64 until the level of the tank rises to electrode 75h at which time the compressed air solenoid 78 is open and the vent 72 is closed, the compressed air forces chlorine from ground receiver 84 into elevated receiver 90, at the same time forces the effluent in tank 64 through outlet 68. Then the valves 72 and 78 are switched so that the valve 72 is open, valve 78 is closed, tank 64 is under atmospheric pressure, the effluent will then continue to flow past check valve 62, fill up the tank 64, and the chlorine from elevated receiver 90 will flow through check valve 92 chlorinating the effluent filling tank 64 in preparation for the next discharge cycle.

The tanks are of a relatively small diameter, for example, 24 inches or less, for the purpose of allowing installation of the unit on ships without requiring cutting of the hull. The tanks and components can be lowered through the hatches as component assemblies and then assembled below deck by the flange connections shown.

In certain conditions where very high effluent is required, there could be a plurality of filters connected in series with regard to liquid flow but manifolded with regard to the vacuum connections 52 and manifolded for the solenoid control vents 56, so that the filters would be back flushed simultaneously and the back flushing would go through the manifold to the top of the vacuum aeration tank.

What is claimed is:

1. An aerobic waste material treatment system of the type comprising a hydraulic comminuting-reaeration tank with an influent connection, a vacuum aeration tank with a siphon connection to the hydraulic comminuting-reaeration tank, a recirculation pump connected to withdraw mixed liquor from the bottom of the vacuum aeration tank and discharge tangentially into the hydraulic comminution-reaeration tank, a venturi connected to the outlet of the recirculating pump with an aspirating connection for drawing a vacuum in the vacuum aeration tank, means for admitting air for aeration of the mixed liquor in the vacuum aeration tank, and the improvements comprising; a filter in a discharge line from the vacuum aeration tank to receive the mixed liquor and filter solids therefrom, a vacuum connection from the vacuum aeration tank to the inlet side of the filter, an effluent discharge line from the filter, a nonvacuum connection to the outlet side of the filter, means normally closing the nonvacuum connection, and means for opening the normally closed nonvacuum connection periodically to allow back flushing of solids on the filter into the vacuum tank due to the pressure differential between the vacuum tank and the nonvacuum connection.

2. An aerobic waste material treatment system as in claim 1 wherein the nonvacuum connection is an atmospheric vent, the normally closed means controlling the atmospheric vent is a solenoid valve, and the means for periodically opening the solenoid valve includes a timer.

3. An aerobic waste material treatment system as in claim 1 wherein the means for admitting air to the vacuum aeration tank includes an atmospheric vent line controlled by a regulating valve.

4. An aerobic waste material treatment system as in claim 1 further comprising a blow down connection on the outlet side of the recirculating pump.

5. An aerobic waste material treatment system as in claim 1 wherein the filter is a screen filter in a filter housing and the nonvacuum connection to the outlet side of the filter is positioned in the filter housing above and remote from the effluent outlet from the filter housing.

6. An aerobic waste material treatment system as in claim 1 further comprising self-ejection and automatic chlorinating means connected to the outlet of the filter for accumulating a tank of effluent, chlorinating the tank of effluent, and cyclicly discharging the chlorinated effluent.

7. An aerobic waste material treatment system as in claim 6 including an effluent receiving tank having its top at a level below the outlet of the siphon and the vacuum aeration tank, a check valve in the line between the filter and the receiving tank, a normally closed pressurized inlet to the receiving tank, and a normally open vent for the receiving tank, liquid level sensors in the receiving tank connected to control the normally closed pressurized inlet and normally open vent to reverse the normal condition when the level of the tank reaches a predetermined high level and revert to the normal condition when the liquid in the tank reaches another predetermined lower level.

8. An aerobic waste material treatment system as in claim 6 further comprising a chlorine solution tank, a measured volume chlorine solution receiver connected via a check valve to the chlorine solution tank, a source of air under pressure to the receiver, means for discharging and controlling the application of air under pressure to the chlorine receiver to discharge the chlorine therein to an elevated chlorine receiver, and means for discharging the chlorine from the elevated chlorine receiver into a receiving tank at the time the receiving tank is connected to an atmospheric vent.

9. An aerobic waste material treatment system as in claim 8 wherein the source of compressed air under pressure is also connected to the effluent tank through a normally closed valve and the effluent tank is vented through a normally open valve controlled by liquid level sensors in such a manner that when the effluent tank is nearly full the liquid level sensors open the normally closed valve allowing the air pressure to discharge the material in the receiver tank and simultaneously to lift the chlorine from the measured solution receptacle to an upper receptacle, and when the liquid level in the effluent tank reaches a predetermined lower level to reverse the vent and pressurized air valves to the normal position allowing the effluent tank to fill with filtered effluent and chlorine solution from the elevated chlorine solution receiver.

* * * * *